W. H. Smith,
Hose Coupling,

No 25,283.          Patented Aug. 30, 1859.

Witnesses:
Geo Bowen Jr
John R. Carroll

Inventor:
Wm H. Smith

UNITED STATES PATENT OFFICE.

WM. H. SMITH, OF NEWPORT, RHODE ISLAND.

HOSE-COUPLING.

Specification of Letters Patent No. 25,283, dated August 30, 1859.

*To all whom it may concern:*

Be it known that I, WILLIAM H. SMITH, of Newport, in the county of Newport and State of Rhode Island, have invented an Improvement in Hose-Couplings, the construction and operation of which I have described in the following specification and illustrated in its accompanying drawings with sufficient clearness to enable competent and skillful workmen in the arts to which it pertains or is most nearly allied to make and use my invention.

My said invention consists in the combination of a set screw, with an open spiral flange so constructed as to connect the parts somewhat on the principle of the bayonet catch, the parts being so constructed and so arranged that the set screw may perform the two-fold duty of a lug to support one of the outwardly projecting flanges upon the inner portion of the coupling, and at the same time also act as a set screw to secure the parts in position as hereinafter more fully set forth.

My invention is represented in the accompanying drawings as follows.

Figure 1:
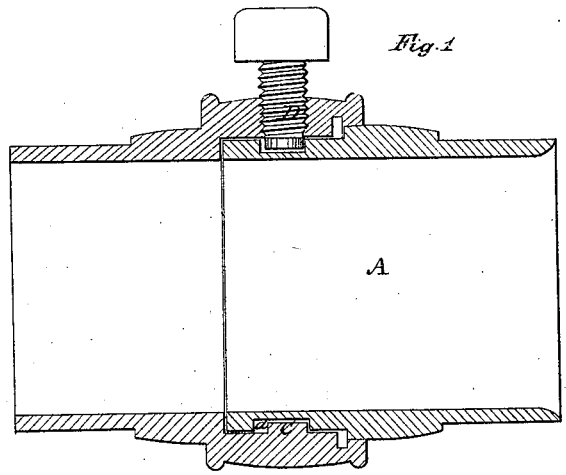
Figure 2:
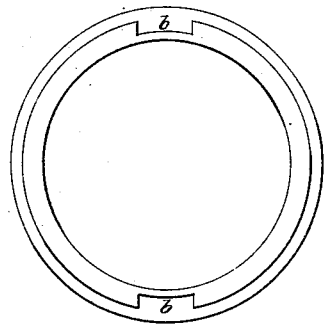
Figure 3:
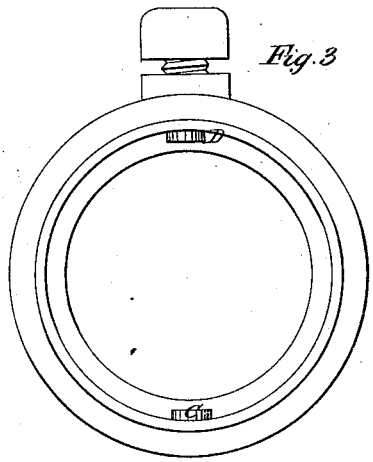
Figure 4:
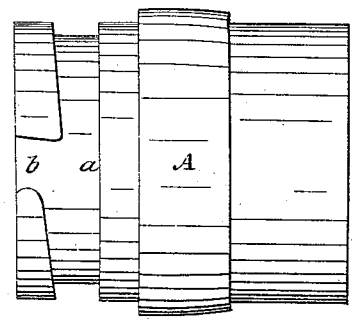

Figure 1 is a longitudinal sectional elevation of my improved coupling. Fig. 2 is an end view of one of the parts of the coupling—the part which goes inside of the other, and upon which the spiral flange which forms one portion of the coupling is made. Fig. 3 is an end view of the other part, or the part in which the set screw which holds the parts in position is secured. Fig. 4 is a side elevation of the inner or male portion of the coupling, showing the construction of the spiral flange which forms a part of the fastening which connects or secures the two parts of the coupling together.

A is the inner or male portion of the coupling. Instead of being secured by a continuous screw, an open spiral flange *a* is used as shown in the drawings, the openings at *b* in which flange, allows the stops C and D to pass through for the purpose of securing one part of the coupling to the other. One of these—the stop D—is also a set screw as well as a stop and is used to prevent the rotation of one part of the coupling upon the other when the hose is in such situations as would otherwise allow it.

There have been hose couplings made before in which an open spiral flange has been used as a part of the connection between the parts, and stops or flanges have been constructed on or attached to the other part for them to bear upon and to complete the connection. It is found however in practice that under circumstances which frequently occur, couplings which are constructed in this manner are very liable to become disengaged, and the hose by that means rendered for the time being unserviceable. To obviate this difficulty, I have so constructed and arranged one of the stops (the stop D) against which the inclined open flange bears as to make it operate also as a set screw to prevent the slipping or disengagement of the coupling when properly connected together, and by this combination of parts I secure a cheap, durable, and reliable coupling which can be readily engaged and disengaged, and may be depended on in reasonable emergency. The construction of the parts is such that the rotation of the set screw and stop D in the direction which tightens it against the inside portion of the coupling has a slight tendency to draw the parts more tightly together, and the loosening of the screw a slight tendency to move the parts in the proper direction to disengage them.

The drawings show the construction of the parts with sufficient clearness to make further description unnecessary.

Having thus fully described the construction and operation of my said invention, the particular improvement which constitutes it and which I claim as having been originally and first invented by me is—

The new article of manufacture or hose coupling described made by combining the open spiral flange *a* with the screw D as set forth.

WM. H. SMITH.

Witnesses:
    GEO. BOWEN, Jr.,
    JOHN R. CASWELL.